Patented Sept. 4, 1945

2,384,361

UNITED STATES PATENT OFFICE 2,384,361

RECOVERY OF COPPER HALIDES

James L. Amos, Midland, Mich., assignor to The Dow Chemical Company, Midland, Mich., a corporation of Michigan No Drawing. Application May 7, 1941,
Serial No. 392,309

3 Claims. (Cl. 23—97)

This inventon relates to a method of recovering copper-containing catalysts from aqueous mixtures thereof with other soluble salts and more particularly to a method of recovering cuprous compounds in a form suitable for use in catalyzing ammonolysis reactions.

In the ammonolysis of organic halo compounds with aqueous ammonia or primary or secondary amines, the cuprous compound which is usually employed as a catalyst is found, upon the completion of the reaction, to be in the form of a complex compound dissolved in the aqueous portion of the reaction mixture together with a hydrohalide of ammonia or the amine. The exact nature of the compounds present in the aqueous portion of the reaction mixture at the end of the reaction period will depend upon the particular reagents used. Thus, when chlorobenzene is ammonolyzed with aqueous ammonia in the presence of cuprous oxide or cuprous chloride as a catalyst, ammonium chloride and a complex compound of cuprous and ammonium chlorides are found in the aqueous portion of the final reaction mixture. When para-bromo-chlorobenzene is ammonolyzed under suitable conditions with monomethyl amine in the presence of cuprous oxide as a catalyst, the bromine atom reacts preferentially to the chlorine atom and the aqueous portion of the final reaction mixture contains monomethyl ammonium bromide and a complex compound of cuprous and monomethyl ammonium bromides. The excess of ammonia or amine which is ordinarily used in reactions of this type will also be found in the final reaction mixture. Small quantities of other products formed during the course of the reaction such as hydroxyl compounds and higher substituted amines may also be present. Thus, in the preparation of aniline from chlorobenzene and aqueous ammonia with a cuprous oxide catalyst, small amounts of phenol and diphenyl amine are formed.

The problem of recovering the cuprous catalyst from ammonolysis processes in a form suitable for re-use in the process is of great economic importance. In many instances the commercial success of the entire process will depend upon the economy of the catalyst recovery.

A well-known method of recovering the cuprous catalyst from the reaction mixture following an ammonolysis of the type mentioned above is that described by Britton and Williams (U. S. Patents 1,726,170 and 1,726,172). In this method the aqueous portion of the reaction mixture containing the complex cuprous compound together with a hydrohalide of ammonia or an amine is treated with an excess of an alkali such as sodium hydroxide and steam-distilled to remove free ammonia or amine which may then be concentrated and re-used in the process. Under these conditions the complex cuprous compound is converted to an insoluble compound which is presumably cuprous oxide or cuprous hydroxide and which may be removed by filtration and re-used as catalytic material. A disadvantage of this known method of recovery is that it requires the use of an amount of alkali, e. g. sodium hydroxide, at least chemically equivalent to the chlorides present in the solution. This represents at least one mol of alkali consumed for each mol of amine formed in the ammonolysis. When cuprous halide is used as the catalyst in place of cuprous oxide, an additional quantity of alkali equivalent to the cuprous halide is required. In practice an excess of alkali is ordinarily used to facilitate satisfactory recovery of catalyst and ammonia or amine. Another disadvantage of this method in the case of ammonolysis with ammonia is that the ammonium chloride is converted into the less valuable compound ammonia. It is thus evident that this method of recovery leaves much to be desired from the standpoint of economy.

It is an object of the present invention to provide a method whereby copper in the cuprous state which has been used as catalyst in an ammonolysis reaction may be recovered from the reaction mixture in a form relatively free of ammonium and amine salts more economically than has hitherto been possible. A further object is to recover the hydrohalide of the ammonia or amine used in the ammonolysis in a substantially pure form.

This invention, whereby the foregoing objects are accomplished, comprises bringing an aqueous solution containing a cuprous halide and an ammonium or amine hydrohalide into contact with a conjugated diolefin under conditions such that the cuprous compound is reacted with the diolefin to form an insoluble complex compound. The precipitate is separated and treated to recover the conjugated diolefin and cuprous salt, while the hydrohalide of the ammonia or amine is recovered from the solution.

Although any conjugated diolefin such as 2-methyl-butadiene-1,3 or 2,3-dimethyl butadiene-1,3 may be used to form the insoluble complex compound with the cuprous halide, butadiene-1,3 is the preferred diolefin, since it is readily and economically available in a high state of purity. The amount of diolefin used depends principally upon the amount of cuprous salt, and to a lesser degree upon the amount of ammonia or amine hydrohalide, present in the solution. In effecting the precipitation at least 1 mol, usually between 1.9 mols and 12 mols and preferably between 2.4 mols and 7.2 mols, of butadiene-1,3 is used for each mol of cuprous salt in solution. The presence of relatively large quantities of ammonia or amine hydrohalide compared to the cuprous salt may necessitate increasing the amount of diolefin to secure substantially complete precipitation of the cuprous copper.

In effecting the precipitation and separation of the complex cuprous compound, the temperature is maintained between the freezing point of the solution and the thermal decomposition temperature of the complex butadiene-cuprous salt compound, preferably between —10.0° C. and 106° C. The reaction proceeds rapidly and is usually complete in one hour or less, particularly if efficient agitation is maintained. However, longer contact of the reacting ingredients is not harmful. The reaction may be carried out at any convenient pressure, but preferably at or above atmospheric pressure. A preferred mode of operation is to pump the liquid diolefin under pressure into a reaction vessel containing the cuprous salt solution. However, the diolefin in gaseous form may be passed into or through the solution, or the solution and the diolefin may be passed countercurrently through an absorption tower.

Upon completion of the reaction the complex compound of cuprous salt and conjugated diolefin is separated from the solution, e. g. by filtration, and treated to recover the diolefin and to convert the copper to a form suitable for use in further ammonolysis reactions. This is preferably accomplished by treatment of the precipitate with aqueous ammonia or an amine. By this treatment the complex compound is dissociated to regenerate the diolefin, which is evolved from the mixture, and leave a solution of the cuprous halide. This residual solution, after mild heating to remove the last traces of diolefin, may be re-used directly in the ammonolytic process. Alternatively the precipitate may be heated directly, or it may be stirred with water and heated, to liberate the diolefin. The cuprous halide remaining after such alternative procedure may be used directly in ammonolysis reactions, or it may be washed with water and dried. The evolved diolefin after washing with dilute acid to remove traces of ammonia or amines may be used to precipitate further quantities of cuprous salts.

To filtrate remaining after removal of the complex compound of diolefin and cuprous salt contains hydrohalide of ammonia or amine together usually with small amounts of unprecipitated copper. This residual copper may be removed in any convenient manner, but preferably by treating the solution with the sulphide of ammonia or the appropriate amine in an amount just sufficient to precipitate the copper and filtering off the insoluble copper sulphide. The remaining solution, upon evaporation or spray drying, yields substantially pure hydrohalide of ammonia or of the amine used in the ammonolysis.

The data given in the following table illustrate the effect of varying the temperature and relative proportion of diolefin on the efficiency of the copper precipitation. In obtaining this data a solution containing the indicated amounts of cuprous chloride and ammonium chloride was placed in a glass container, and cooled to —10° C. The diolefin, e. g. liquid butadiene, was added and the container was closed and agitated vigorously under the conditions of time and temperature noted. The container was then opened, any unreacted butadiene was allowed to volatilize, and after removing the butadiene-cuprous salt complex by filtration the copper remaining in solution was determined. From the analysis of the solutions before and after the precipitation with butadiene, the per cent copper removed from the solution was calculated.

Table

| Exp. | Aqueous solution used | | | Mols $C_4H_6$ used | Reaction time | Reaction temp., °C. | Per cent Cu removed from solution |
| --- | --- | --- | --- | --- | --- | --- | --- |
| | Vol. cc. | Mols Cu calc. as $Cu_2Cl_2$ | Mols $NH_4Cl$ | | | | |
| | | | | | Hours | | |
| 1 | 20 | 0.005 | 0.06 | 0.0096 | ¼ | 0 | 59.5 |
| 2 | 20 | 0.005 | 0.06 | 0.024 | ¼ | 0 | 91.0 |
| 3 | 20 | 0.005 | 0.06 | 0.036 | ¼ | 0 | 92.9 |
| 4 | 20 | 0.005 | 0.06 | 0.06 | ¼ | 0 | 93.6 |
| 5 | 60 | 0.0164 | 0.188 | 0.096 | ¼ | 10 | 81.5 |
| 6 | 30 | 0.0127 | 0.0938 | 0.096 | ¼ | 25 | 84.3 |
| 7 | 20 | 0.0084 | 0.0625 | 0.12 | 22¼ | 25 | 86.5 |
| 8 | 20 | 0.0084 | 0.0625 | 0.12 | 22¼ | 50 | 86.4 |

Certain steps preliminary to the actual precipitation of the copper compound may advantageously be employed in practice of the invention. For instance, it is preferable to submit the solution which is to be treated with the diolefin to a preliminary steam distillation to free it from uncombined ammonia or amine if present, and from various impurities or side products which may have been formed during the ammonolysis, such as organic hydroxyl compounds, organic ethers, and the like. If the solution has been unduly exposed to air, oxidation of a portion of the cuprous copper to cupric copper may have occurred and for this reason it is preferable to add sufficient reducing agent to the solution to insure all of the copper being present in the cuprous form. A number of reducing agents are effective, one convenient way of accomplishing the reduction being to maintain the solution in contact with metallic copper during the steam distillation just referred to. Further oxidation may be prevented by keeping air from coming in contact with the solution. The solution may also be filtered to remove insoluble products such as insoluble iron compounds, scale, tar, and the like which may be present. Other ways of treating the solution to effect its preliminary purification will be apparent and the scope of the invention is not to be construed as being limited by the nature or sequence of such treatments.

Other methods of applying the principle of the invention may be employed instead of those explained, change being made as regards the process herein disclosed, provided the means stated by any of the following claims or the equivalent of such stated means be employed.

I therefore particularly point out and distinctly claim as my invention:

1. In a method of obtaining a cuprous halide from a solution containing cuprous halide together with a hydro-halide of a compound selected from the class consisting of ammonia and amines, the steps which comprise mixing the solution at a temperature of from —10° to 100° C. under autogenous pressure with from 1.9 to 12 mols of a liquid diolefin for each mol of cuprous halide in the solution to precipitate a complex compound of the cuprous halide and the diolefin, separating the precipitate so formed and dissociating the separated complex compound to regenerate the diolefin and the cuprous halide.

2. The method of claim 1 wherein the diolefin is butadiene-1,3.

3. In a method of obtaining cuprous chloride from a solution containing cuprous chloride together with ammonium chloride, the steps which comprise mixing the solution at a temperature of from $-10°$ to $100°$ C. under autogenous pressure with from 1.9 to 12 mols of butadiene-1,3 for each mol of cuprous chloride in the solution to precipitate a complex compound of cuprous chloride and butadiene, separating the precipitate so formed and dissociating the separated complex compound to regenerate butadiene and cuprous chloride.

JAMES L. AMOS.